United States Patent [19]
Ohno

[11] Patent Number: 5,541,663
[45] Date of Patent: Jul. 30, 1996

[54] CHARACTER DISPLAY CIRCUIT AND METHOD FOR SUPERIMPOSING CHARACTER CODE DURING BLANKING PERIOD OF VIDEO SIGNAL

[75] Inventor: Shoji Ohno, Katsuta, Japan

[73] Assignee: Hitachi, Ltd., Tokyo, Japan

[21] Appl. No.: 241,695

[22] Filed: May 12, 1994

[30] Foreign Application Priority Data

May 21, 1993 [JP] Japan ................... 5-119539

[51] Int. Cl.$^6$ ............... H04N 7/087; H04N 5/445
[52] U.S. Cl. ........................ 348/478; 348/564
[58] Field of Search .................... 348/478, 476, 348/473, 464, 465, 467, 468, 461, 722, 589, 600, 598, 584, 564, 563, 565, 569, 511; 358/335; 345/113, 116, 141; 360/14.1, 33.1; H04N 5/445, 7/087, 5/44

[56] References Cited

U.S. PATENT DOCUMENTS

| | | | |
|---|---|---|---|
| 3,891,792 | 6/1975 | Kimura | 348/467 |
| 3,911,420 | 10/1975 | Lampson | 348/589 |
| 4,308,557 | 12/1981 | Dietrich | 348/478 |
| 4,633,297 | 12/1986 | Skerlas et al. | 348/589 |
| 4,675,737 | 6/1987 | Fujino et al. | 348/589 |
| 5,097,348 | 3/1992 | Suetaka | 358/335 |
| 5,202,669 | 4/1993 | Ishimochi et al. | 348/563 |
| 5,237,412 | 8/1993 | Nakajima | 348/461 |
| 5,299,006 | 3/1994 | Kim | 348/571 |
| 5,311,311 | 5/1994 | Harigai et al. | 348/476 |
| 5,327,176 | 7/1994 | Forler et al. | 348/565 |

FOREIGN PATENT DOCUMENTS 2091875  3/1990  Japan ................... G11B 27/28

OTHER PUBLICATIONS

"M 35040", Mitsubishi–Technical Data, pp. 1–30.
"CX–7907A", Sony, Technical Data, pp. 1–18.
"EIA–608", Recommended Practice for Line 21 Data Service pp. 1–9.
"MC144143", Motorola–Technical Data,. 1991, pp. 1–18.
"Nikkei Electronics", 1991, 9, 30 (No. 537), pp. 149–158.
"Techniken zur Übertragung von Untertiteln in Ferneshprogrammen insbesondere zur wahlweisen Verwendung beim Zuschauer", Rundfunktechnische Mitteilungen, vol. 20, No. 4, Aug. 1976 , Norderstedt de, pp. 138–146.
"A Single Chip Line 21 Captioning Decoder", IEEE Transactions on Consumer Electronics, vol. 38, No. 3, Aug. 1992, New York, N. F. Hurley, pp. 261–267.

Primary Examiner—Safet Metjahic
Attorney, Agent, or Firm—Antonelli, Terry, Stout & Kraus

[57] ABSTRACT

A character display circuit in which a circuit for generating a character display timing signal in synchronism with vertical and horizontal synchronizing signals controls the frequency of dots constituting a character such that it is an integer multiple of the coding frequency for bits of a closed caption code, character coded data conforming to a format of the closed caption code is generated in synchronism with a predetermined horizontal synchronizing signal during the blanking period of a video signal using dot patterns for encoding character data, and the character coded data is superimposed on the video signal.

14 Claims, 9 Drawing Sheets

FIG. 1
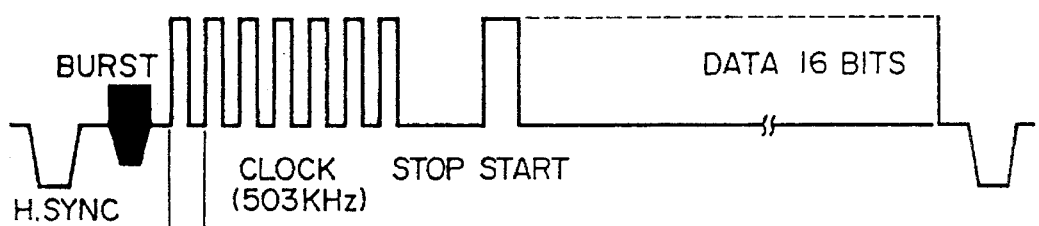
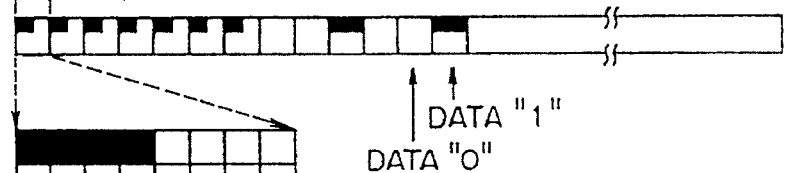
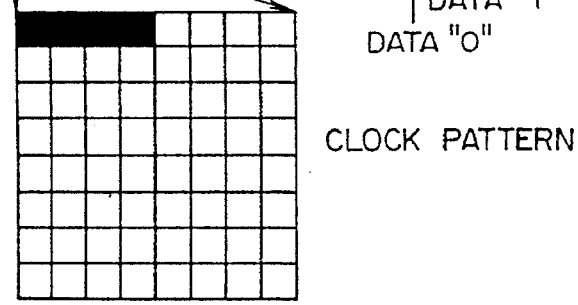
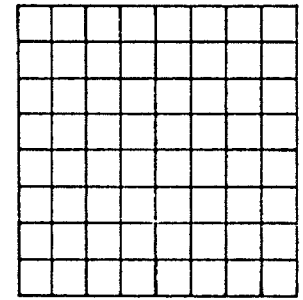
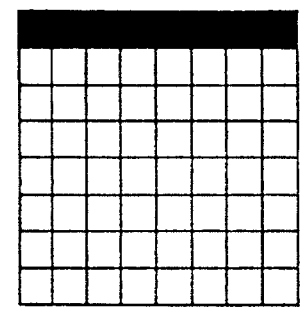

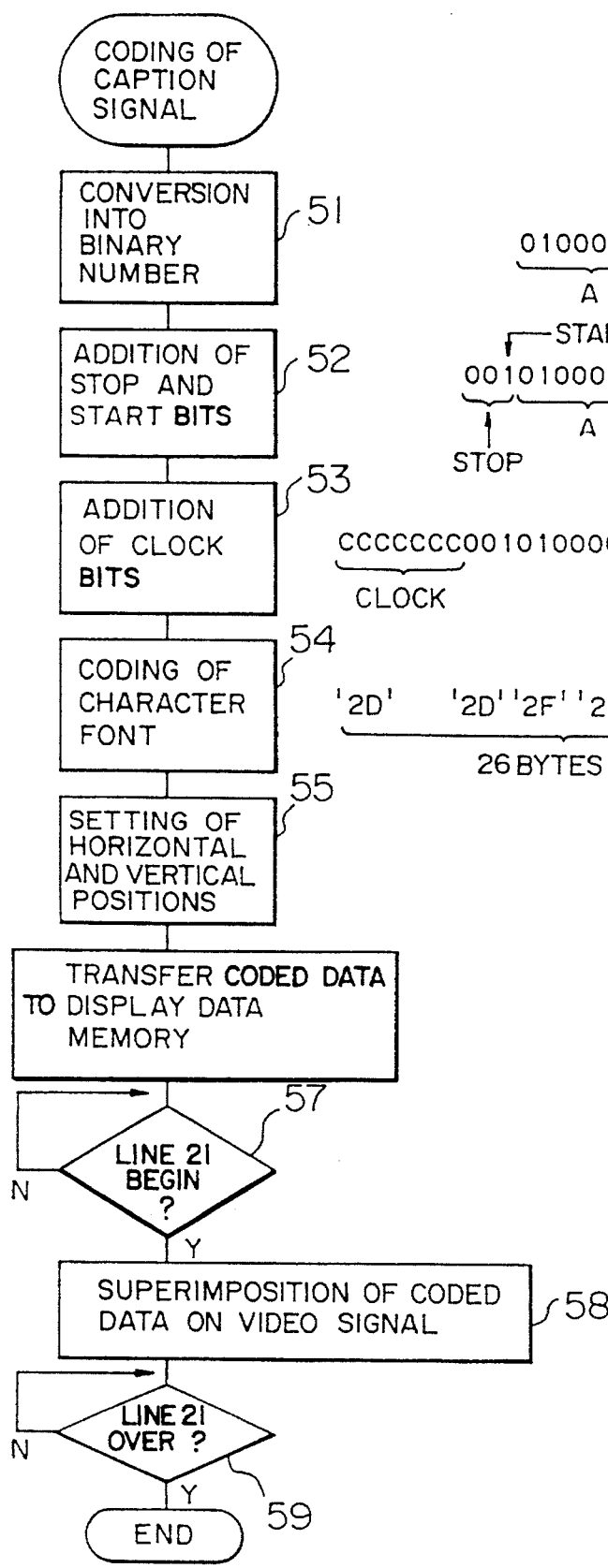

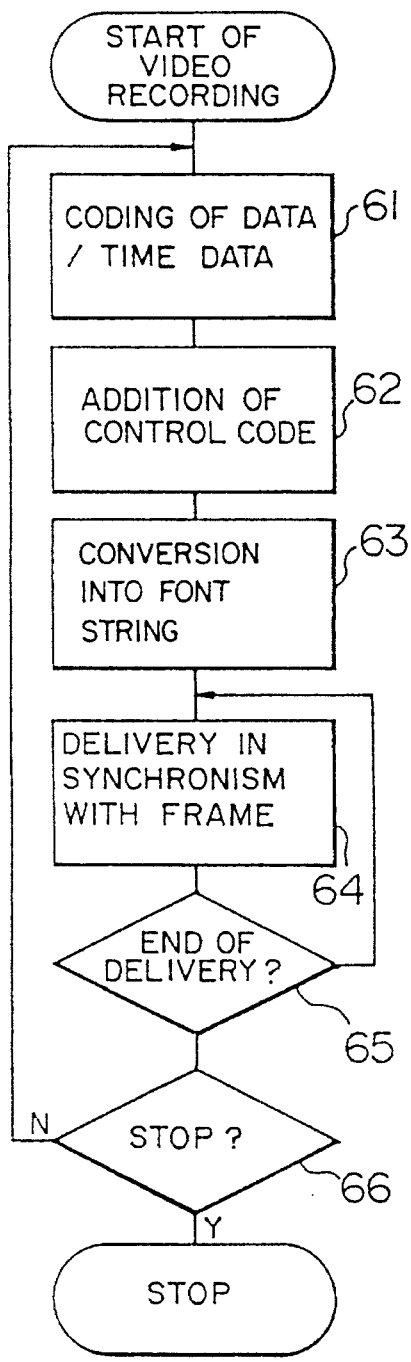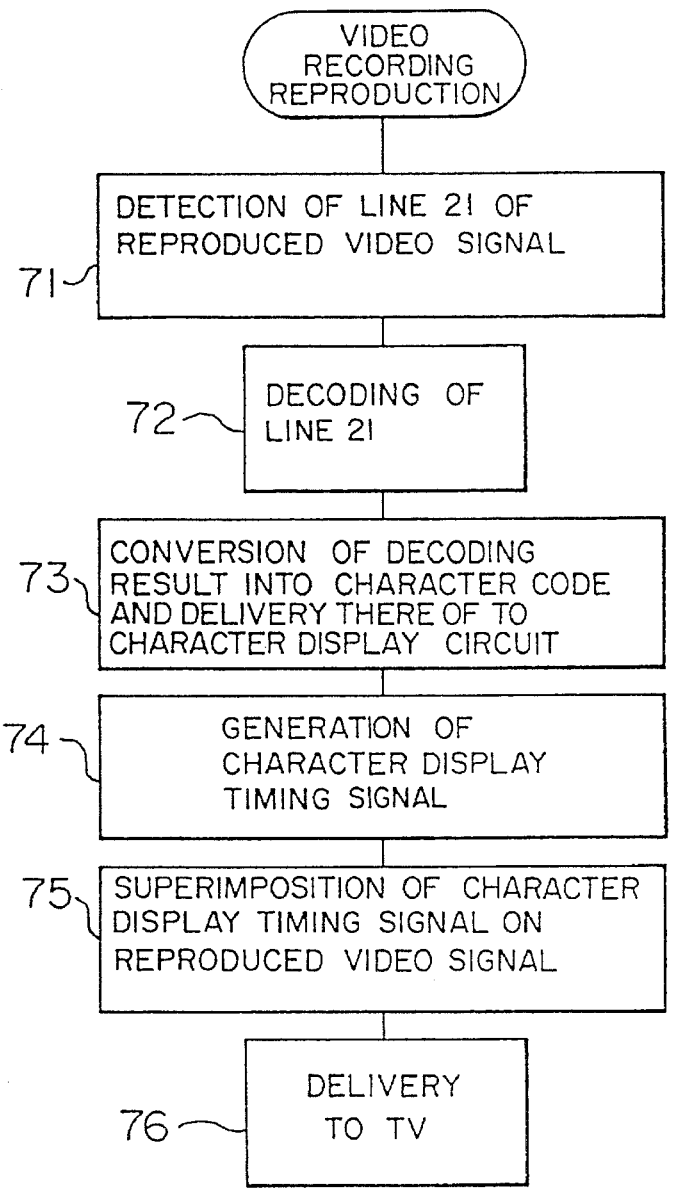
FIG. 9A
FIG. 9B

| DISPLAY CHARACTER | HEXADECIMAL CODE | OSD FONT STRING |
|---|---|---|
| CONTROL CODE | 1460 | (G)(H)(1)(1)(4)(6)(0) |
| | 1460 | (G)(H)(1)(1)(4)(6)(0) |
| 03 | 3033 | (G)(H)(1)(3)(0)(3)(3) |
| /3 | 2F33 | (G)(H)(1)(2)(F)(3)(3) |
| 0/ | 302F | (G)(H)(1)(3)(0)(2)(F) |
| 93 | 3933 | (G)(H)(1)(3)(9)(3)(3) |
| △1 | 2031 | (G)(H)(1)(2)(0)(3)(1) |
| 2: | 323A | (G)(H)(1)(3)(2)(3)(A) |
| 00 | 3030 | (G)(H)(1)(3)(0)(3)(0) |

5,541,663

CHARACTER DISPLAY CIRCUIT AND METHOD FOR SUPERIMPOSING CHARACTER CODE DURING BLANKING PERIOD OF VIDEO SIGNAL

BACKGROUND OF THE INVENTION

The present invention relates to a character display circuit having the function to display a character by superimposing a character code on a video signal and a method for character display, and more particularly to a character display circuit and method having the function to generate a character display timing signal referenced to vertical and horizontal synchronizing signals of a video signal and the function to generate, as part of the character display timing signal, a character code which conforms to a VBI (video blanking interval) code format used to perform closed captioning by superimposing the character code during the blanking period of the video signal.

Conventionally, a character display circuit for generating a character display timing signal referenced to vertical and horizontal synchronizing signals of a video signal and displaying a character pattern on a television screen and a VBI character coder used for closed captioning are constructed in the form of separate circuits.

For example, M35040 manufactured by Mitsubishi Denki is a commercially available character display circuit. On the other hand, CX-7907A manufactured by Sony is a commercially available character coding circuit utilizing the vertical blanking period as in the case of a character broadcast signal.

A known example of a technique utilizing character broadcast is described in JP-A-2-91875.

In some of VTRs for business use, a character display circuit and a VBI character coder are provided separately and a closed caption signal is superimposed during the blanking period of a video signal when recording is carried out by using the VTR. Through this, when a closed caption decoder is installed in a TV, a caption can be reproduced, on the TV side, from a signal reproduced by the VTR. For example, with a date/time of recording superimposed on a video signal, the date/time of video recording can be displayed as a caption on the TV screen at any time and the caption can be erased as necessary. Accordingly, in contrast to the case where a display character is superimposed directly on image data, the recorded picture will not be hindered.

Additionally, the VBI character coder provided for the VTR is used for superimposition of digital data generated concomitantly with the recorded picture such as absolute addresses on the tape and editing control marks.

But, due to the fact that the character display circuit and the VBI character coder are constructed in the form of separate circuits, there arises a problem that the circuit configuration is complicated.

SUMMARY OF THE INVENTION

An object of the present invention is to provide a novel character display circuit and method which can fulfill the function of the VBI character coder in addition to the function of the conventional character display circuit in order to significantly simplify the circuit configuration.

To accomplish the above object, a circuit for generating a character display timing signal referenced to vertical and horizontal synchronizing signals of a video signal has a circuit for detecting a predetermined horizontal synchronizing signal within the blanking period of the video signal, a circuit for generating character coded data, conforming to a VBI character code format determined by a closed caption standard, in synchronism with the detected predetermined horizontal synchronizing signal and a circuit for superimposing the generated character coded data on the video signal, wherein the frequency of a character display dot, which is a minimum unit of a character, is an integar multiple of the coding frequency in the character broadcast.

The principle of the character code generator according to the invention will now be described.

The ordinary character display function can be realized by superimposing a character display timing signal generated in a character display circuit on an original video signal. Character/caption broadcast can also be realized by superimposing a coded character timing signal after a specified horizontal synchronizing signal. Thus, the dot frequency of font ROM data for character pattern generation is defined to be an integer multiple of the coding the frequency for clock, data "0" or data "1" in the character/caption broadcast. Under this condition, front ROM data corresponding to coded display characters is superimposed after the predetermined horizontal synchronizing signal. The correspondence is shown in FIGS. 1 and 2. FIG. 1 shows a coded portion in character broadcast based on the closed caption standard EIA-608 in the USA. Character broadcast data is superimposed on line 21 of the video signal after the horizontal synchronizing signal and is coded pursuant to an NRZ system at 503 KHz. Codes of two characters are inserted in a data portion of 16 bits. FIGS. 2A to 2D show an example of a character pattern string for generation of character broadcast data according to the present invention. In this example, one character is composed of a pattern of 8×8 dots and the frequency for one dot is set to 053 KHz×8=4.024 MHz..

When the frequency for one character constituting a character pattern is set to be equal to the clock frequency in the character broadcast, one character corresponds to one bit of the character broadcast data and control can be most simplified.

If an integer relation is set between the frequency for one character constituting a character pattern and the clock frequency in the character broadcast, a plurality of bits can be expressed by one character and conversely one bit can be expressed by a plurality of characters. Accordingly, even when the above, limitation is added to the character display function, the number of display characters per line can be set freely to some extent.

BRIEF DESCRIPTION OF THE DRAWINGS

FIG. 1 shows a code format for a character broadcast signal in the USA.

FIGS. 2A to 2D show an example of character pattern design available when the length of one bit in the character broadcast equals a timing for one character in a character display circuit.

FIG. 6 is a flow chart showing the processing procedure for encoding a caption signal.

FIGS. 7A to 7D shows an example of coding characters.

FIG. 9A is a flow chart showing the procedure for encoding in the VCR of FIG. 8.

FIG. 9B is a flow chart showing the procedure for reproduction in the VCR of FIG. 8.

DESCRIPTION OF THE PREFERRED EMBODIMENTS

Referring now to FIGS. 2B, 2C and 2D, there is illustrated an example of character pattern design available when one bit length (D=1/503,488 Hz) in character broadcast based on the USA EIA-608 standard equals the period for one character in a character display circuit. In this case, one character is composed of 8 dots×8 lines as shown in FIGS. 2B to 2D. Namely, in this case, one bit in the character broadcast corresponds to 8 dots. Accordingly, the dot frequency in the character display circuit is required to be equal eight times the clock frequency (1/D) in the character broadcast, i.e., (1/D)×8=4.024 MHz. A character pattern of a clock is shown in FIG. 2B. Seven of the character patterns are arrayed on the same line, thereby forming a clock signal in the character broadcast signal shown in FIG. 1. Data "0" is shown in FIG. 2C and data "1" is shown in FIG. 2D. The data patterns are arrayed on the same line in accordance with a data string in the character broadcast, thereby generating character broadcast signal shown in FIG. 1.

Figure 3:
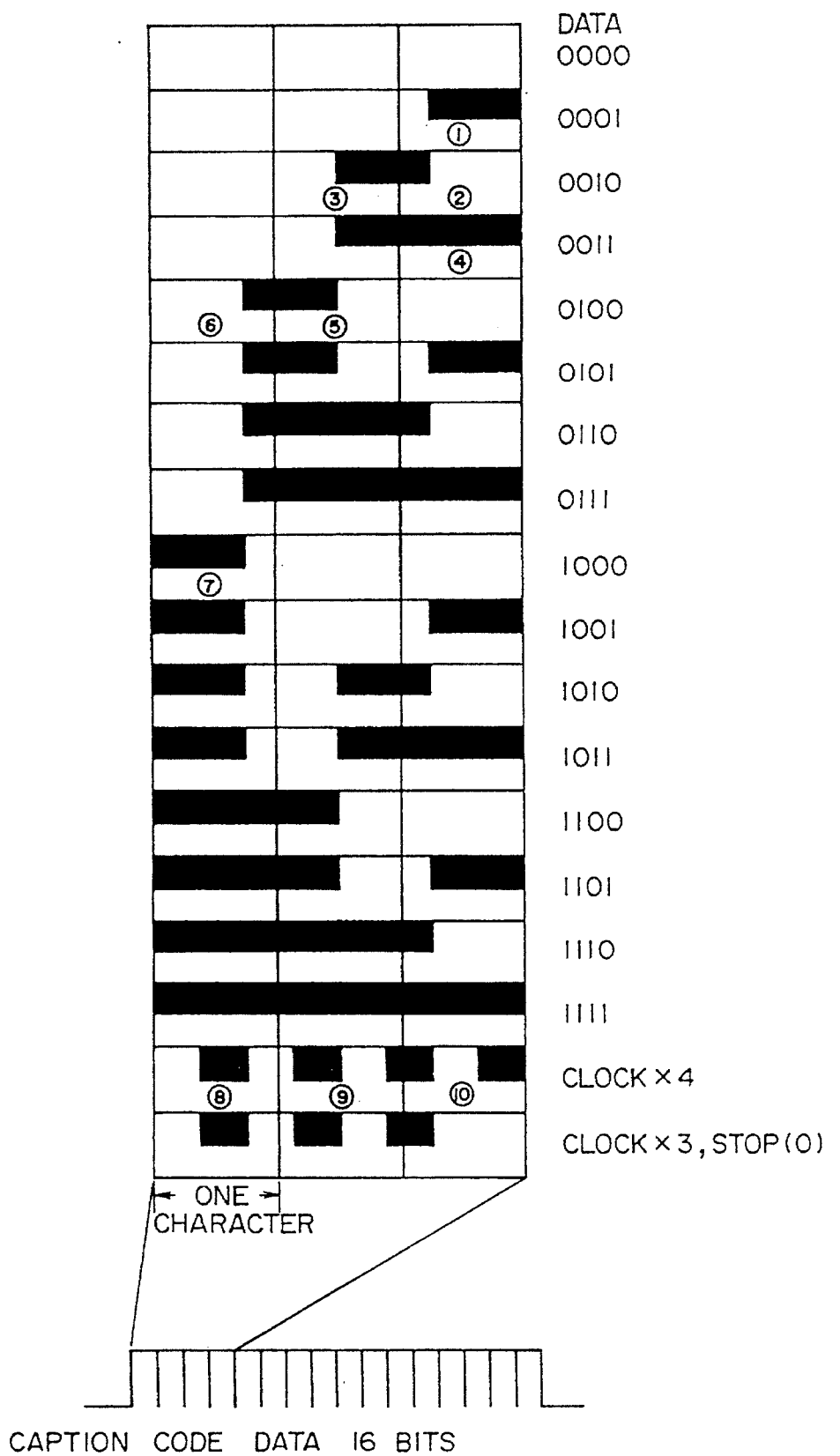
FIG. 3 shows an example of character pattern design available when the length of 4 bits in the character broadcast equals three characters in the character display circuit.

FIG. 3 shows an example of character pattern design available when the length of four bits (4D) in the character broadcast equals three characters in the character display circuit. When one character is composed of 8 dots×8 lines as in the case of FIG. 2B to 2D, corresponds to 6 dots and the dot frequency must be (1/D)×6=3.018 MHz. As shown at ① to ⑩ in FIG. 3, ten kinds of character patterns must be prepared. By arraying the character patterns on the same line in accordance with a character broadcast data string, a character broadcast signal can be generated.

As a circuit for display of the character signal on a display unit, a known circuit can be used.

Figure 4:
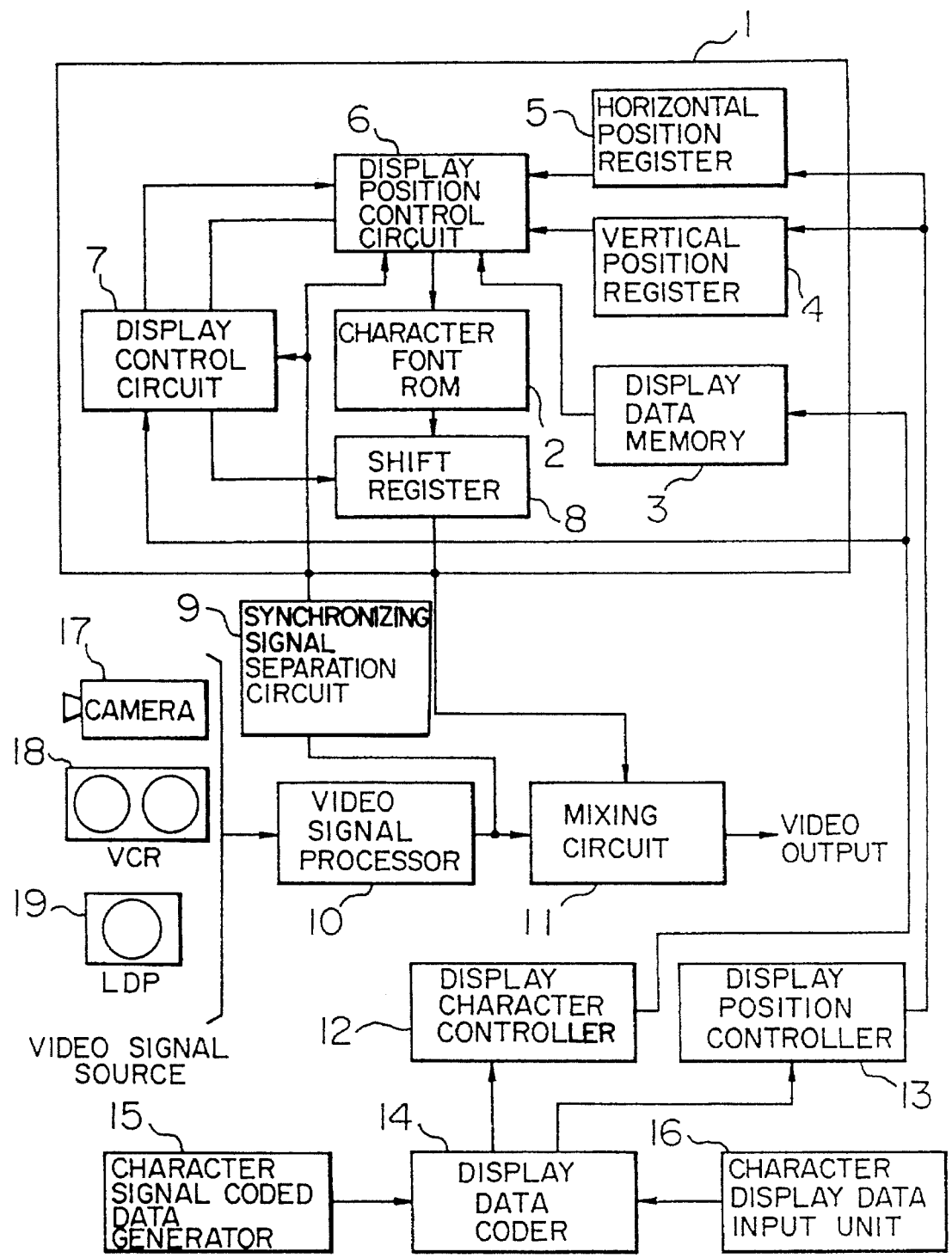
FIG. 4 is a block diagram of a character display circuit according to the present invention.
Figure 5:
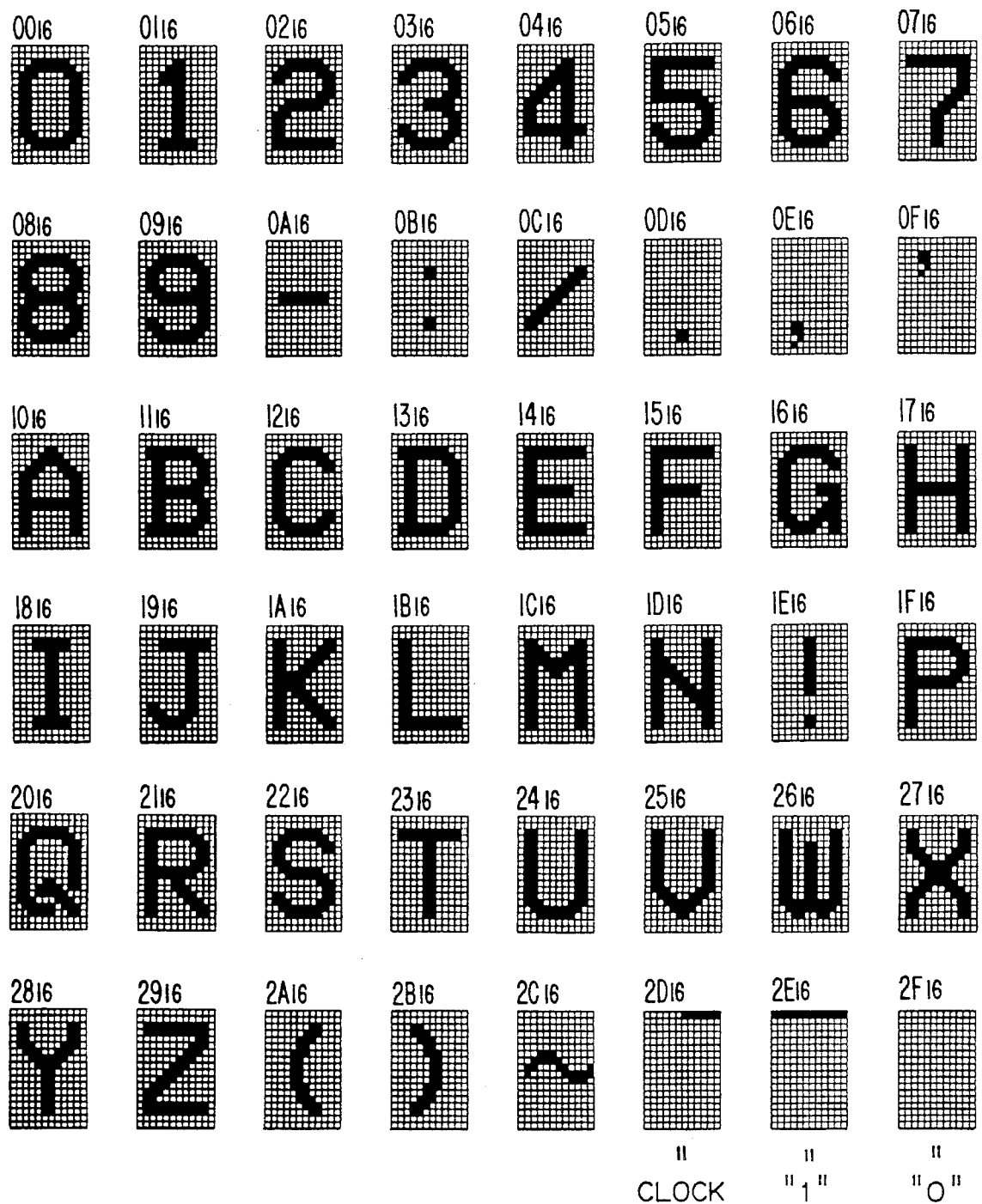
FIG. 5 shows character patterns stored in a character font ROM.

Referring to FIGS. 4 to 6, the specific procedure for coding a caption signal by using the character display circuit will now be described. The character display circuit is generally designated by reference numeral 1. Stored in a character font ROM 2 are character patterns as shown in FIG. 5. A hexadecimal code above each character pattern indicates a character code stored in a display data memory 3. Codes "2D" "2E" and "2F" designate patterns which are specially provided in the present invention for the purpose of coding the caption signal.

Since in the present embodiment one character is composed of 12 dots×18 lines as shown in FIG. 5, the dot frequency is 12 times by the bit frequency of the caption signal in the USA, that is, (1/D)×12=6.042 MHz.

Available as a video signal source for superimposition of the caption signal is a video camera 17, a VCR (video cassette recorder) 18 or an LDP (laser disc player) 19 as shown in FIG. 4. In the character display circuit 1, a video signal inputted from the video signal source is processed by a video signal processor 10 and used to cause a display control circuit 7 to deliver a character display timing signal referenced to vertical and horizontal synchronizing signals generated by a synchronizing signal separation circuit 9. A display position control circuit 6 is loaded with a character code to be displayed from the display data memory 3 and controls character font ROM 2 to output corresponding character font ROM data at a display position determined in relation to a reference point designated by a vertical position register 4 and a horizontal position register 5. The ROM data is delivered, through a shift register 8, in the form of character dot data and superimposed on the video signal by means of a mixing circuit 11.

A display character controller 12 performs generation and communication of data to be stored in the display data memory 3. A display position controller 13 performs generation and communication of data to be stored in the vertical position register 4 and horizontal position register 5. A character signal coded data generator 15 designates characters to be superimposed during the blanking period of the video signal and generates data indicative of the characters. A character display data input unit 16 generates character display data corresponding to a character display timing signal referenced to vertical and horizontal synchronizing signals of the video signal. The character display timing signal is character data which can be displayed on the TV screen without being decoded so as to be recognized as a character by viewers. A display data coder 14 has a conversion table for assigning "2D" "2E" and "2F" to the clock, data "1" and data "0" of the caption code, and "00" to "2C" to each character display data, respectively, as shown in FIG. 5 and converts data generated by the character signal coded data generator 15 and data generated by the character display data input unit 16 into display data codes which conform to the character display circuit 1.

Alternatively, the display character controller 12, display position controller 13 and display data coder 14 can be constructed as part of a microcomputer.

The procedure for coding control will now be described with reference to FIG. 6. Steps 51 to 54 are carried out in the display data coder 14.

Step 51: A character to be coded into a caption signal is converted into a binary number. For example, in the case of "AB", conversion into "01000001 000010" is effected. (FIG. 7A)

Step 52: 2 bits for STOP and 1 bit for START are added. (FIG. 7B)

Step 52: 7 bits for CLOCK are added. (FIG. 7C)

Step 54: The data is coded into corresponding character codes of the character font ROM 2 by using the conversion table. In this example, the clock, "1" and "0" are converted into "2D" "2E" and "2F" respectively Step 55: Predetermined values are set in the horizontal position register 5 and vertical position register 4 by means of the display position controller 13. In the case of the caption signal in the USA, the horizontal position is set to 10.5 µs and the vertical position is set to line 21.

Step 56: The data coded in step 54 which consists of 26 bytes in total is transferred to the display data memory 3 by means of the display character controller 12. (FIG. 7D)

Step 57: The synchronizing signal separation circuit 9 separates vertical and horizontal synchronizing signals from a video signal on which the caption signal is to be superimposed. The display position control circuit 6 counts horizontal synchronizing signals beginning from each vertical synchronizing signal and outputs coded data stored in display data memory 3 during line 21.

Step 58: Coded data in the form of a character display timing signal is superimposed on the video signal by means of the mixing circuit 11.

Step 59: The superimposition of the caption signal continues until line 21 is on When line 21 is over, the superimposition of the caption signal ends.

As an embodiment of the present invention, an instance will be described in which the date of video recording is recorded as closed caption data on a VCR. This is meritorious in that the date of video recording can be displayed only when needed during reproduction, without causing distraction during ordinary video viewing.

Figure 8:
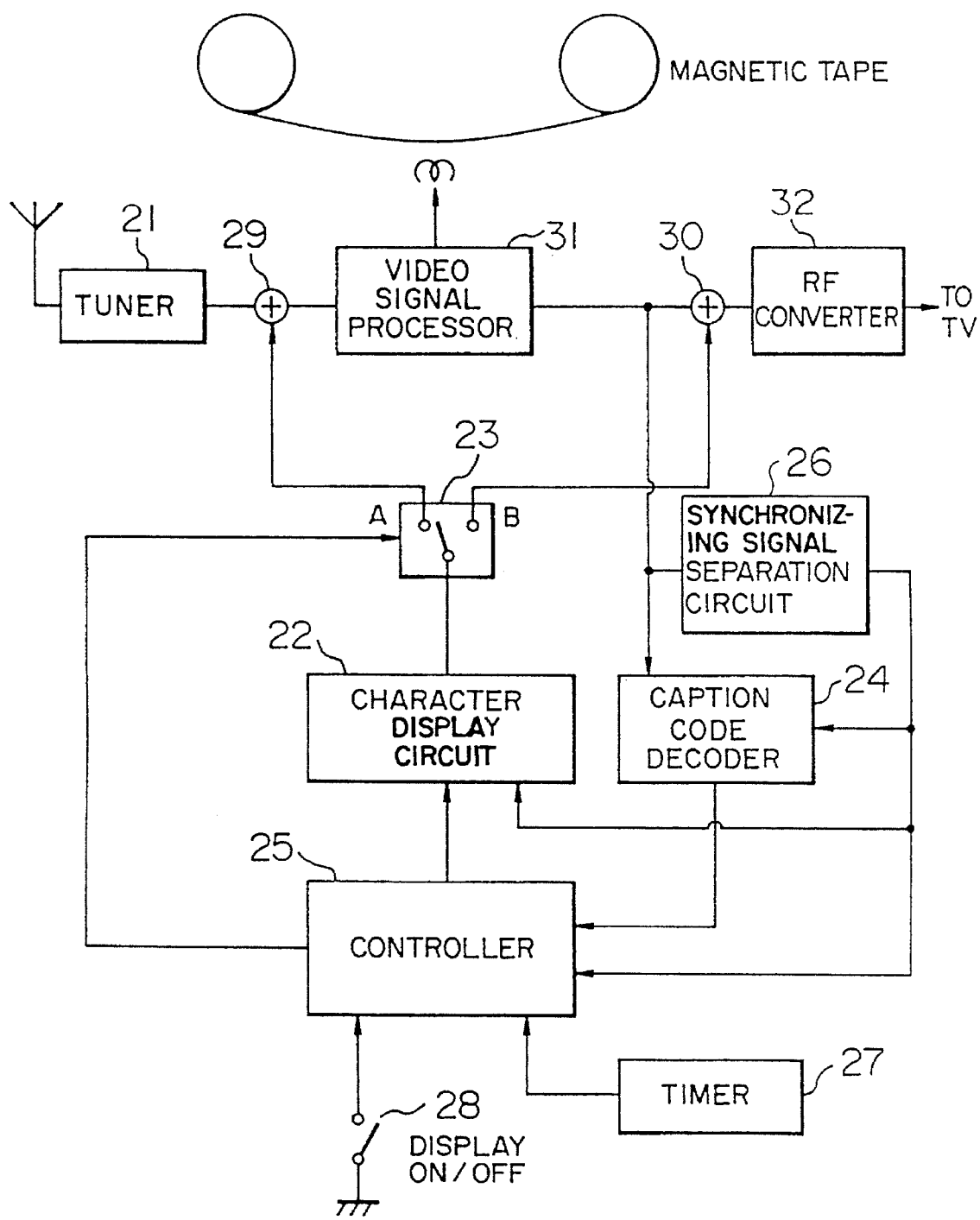
FIG. 8 is a block diagram of a VCR using the character display circuit according to the present invention.

FIG. 8 is a block diagram showing the construction of the VCR. In a video signal processor 31, signal processing related to recording and reproduction of a video signal are carried out. A video signal to be recorded on a magnetic tape is recorded while a caption code is superimposed on a video output of a tuner 21 during line 21.

The caption code delivered out of a character display circuit 22 according to the present invention is superimposed on the video signal by means of an adder 29 when a switch circuit 23 is connected to a contact A.

A flow chart during reproduction is shown in FIG. 9B.

During reproduction, a synchronizing signal is separated from the VCR output signal in synchronizing signal separation circuit 26, and vertical and horizontal synchronizing signals are counted by a caption code decoder 24 to detect line 21 of a reproduced video signal (step 71) and the reproduced video signal is decoded and transferred to a controller 25 (step 72). The result of the decoding is converted by the controller 25 into a character code which in turn is delivered to the character display circuit 22 (step 73). The character display circuit 22 responds to the inputted character code to generate a character display timing signal representing a conventional character pattern (step 74). The generated character display timing signal passes through a contact B of the switch circuit 23, is superimposed on the reproduced video signal by means of an adder 30 (step 75) and is delivered to a TV through an RF converter 32 (step 76).

During recording of the caption code, encoded date/time data is prepared based on output data of a timer 27. Selection as to whether caption data is displayed during reproduction is effected by an ON/OFF switch 28.

In a caption code encoding OSD (On-Screen Display) font, one character is composed of 8 dots and in an example to be described below, one bit of the caption code corresponds to 6 dots.

Specifically, the procedure for encoding date/time data into a caption code will be described with reference to FIG. 9A and FIGS. 10A and 10B.

In step 61, following the start of video recording, date/time data representing an output of the timer circuit 27 is converted into an ASCII hexadecimal code. For example, a character "0" is indicated by "30" (0011 0000) in terms of the ASCII hexadecimal code.

In step 62, a control code is added by the controller 25. In an example of FIG. 10A, in order to provide a display of a white character on line 15, a control code of "1460" is added. As shown in FIG. 10B, the control code is twice in accordance with a convention expected by the decoding side.

Figures 10A, 10B:
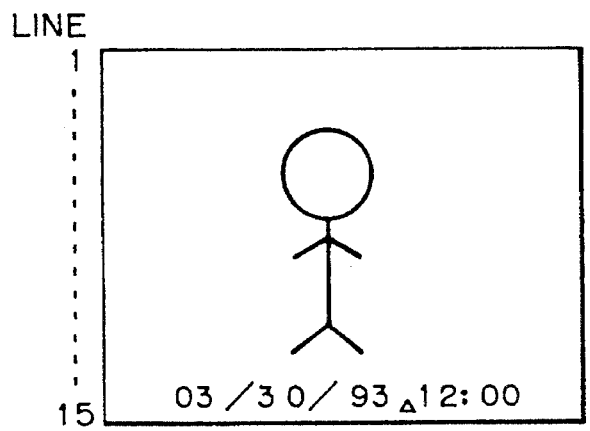
FIG. 10A shows an example of a display on a TV screen of data that has been encoded.
FIG. 10B shows how the data in FIG. 10A is encoded.
Figures 11, 12:
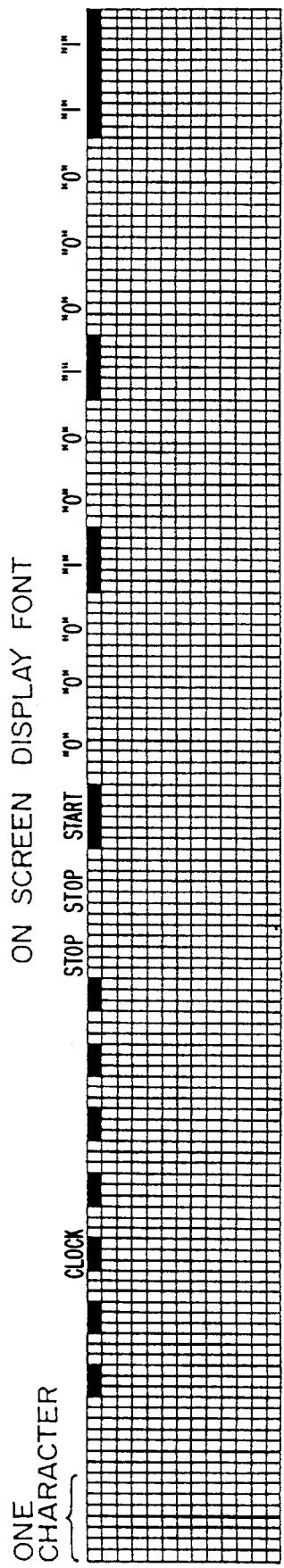
FIG. 11 shows an example of an OSD (on-screen display) character font string.
FIG. 12 shows the correspondence between OSD character font patterns used in FIGS. 10A and 10B and encoded data.

In step 63, the ASCII hexadecimal code is converted by the controller 25 into an OSD (on-screen display) font string shown in FIG. 10B and 11. This font string is determined under a standard such as EIA-608, according to which 7 clock bits, 2 stop bits and 1 start bit are always added to the front of 16 data bits per one line. OSD font data of (G)(H)(I) shown in FIG. 10B corresponds to the additional bits. In the example of FIG. 10B, 4-bit data is represented by 3 characters of the OSD font, and the 4-bit data (0) to (F) and CLOCK, STOP and START are represented as shown in FIG. 12. In FIG. 12, a numeral or letter in parentheses indicates a hexadecimal number. Thus, for example, in the case of date/time data as shown in FIG. 10A, the OSD font data shown at the OSD font string in FIG. 10B is produced.

In step 64, the data is delivered at a rate of one line of OSD font string in synchronism with the vertical synchronizing signal of a frame from the character display circuit 22 so as to be recorded on line 21 in odd fields.

In step 65, whether the end of delivery has occurred is checked.

In step 66, as long as the video recording continues to proceed, the encoding processing in steps 61 to 65 is carried out while updating the date/time data.

Through the above procedure, the date and time of video recording can be recorded as a closed caption code. Nikkei Electronics, 1991.9.30 (No. 537), pp 149–158, and Motorola Semiconductor TECHNICAL DATA MC144143 describe the reproduction of the closed caption code and reference should be made thereto.

I claim:

1. A character display circuit comprising:

means for generating a character display timing signal in synchronism with vertical and horizontal synchronizing signals;

means for detecting a predetermined horizontal synchronizing signal within the blanking period of a video signal;

means for generating character coded data conforming to a signal format of a character broadcast coded signal by encoding character data using dot patterns for encoding character data in synchronism with said detected predetermined horizontal synchronizing signal; and means for superimposing said generated character coded data on said video signal within the blanking period of said video signal.

2. A character display circuit according to claim 1 further comprising:

means for decoding the character broadcast coded signal superimposed on the video signal; and means for superimposing a character display timing signal delivered out of said means for generating a character display timing signal on an output video signal on the basis of an output of said decoding means.

3. A character display circuit according to claim 1, wherein said means for generating character coded data generates character coded closed caption data.

4. A character display circuit according to claim 1, wherein said means for generating character coded data generates character coded data without demodulating character information.

5. A character display circuit comprising:

means for generating a character display timing signal in synchronism with vertical and horizontal synchronizing signals;

means for detecting a predetermined horizontal synchronizing signal within the blanking period of a video signal;

means for generating character coded data conforming to signal format of a character broadcast coded signal, in synchronism with said detected predetermined horizontal synchronizing signal; and means for superimposing said generated character coded data on said video signal;

wherein said means for generating character coded data includes means for generating coded data in which the integer multiple of the period for dots constituting one character equals one bit of the character broadcast coded signal.

6. A character display circuit according to claim 5 wherein said means for generating coded data includes means for generating a pattern in which the period for one character equals one bit of the character broadcast coded signal and character fonts correspond to "clock", data "0" and data "1" of the character broadcast coded signal.

7. A character display circuit according to claim 5 wherein said means for generating coded data includes a ROM.

8. A character display circuit comprising:

means for generating a character display timing signal in synchronism with vertical and horizontal synchronizing signals;

means for detecting a predetermined horizontal synchronizing signal within the blanking period of a video signal;

means for generating character coded data conforming to a signal format of a character broadcast coded signal, in synchronism with said detected predetermined horizontal synchronizing signal; and means for superimposing said generated character coded data on said video signal;

wherein said means for superimposing includes means for performing switching between superimposing on an input video signal and superimposition on an output video signal.

9. A character display method comprising the steps of:

generating character coded data conforming to a signal format of a character broadcast coded signal by encoding character data using dot patterns for encoding character data with a character display circuit for generating a character display timing signal in synchronism with vertical and horizontal synchronizing signals;

detecting a predetermined horizontal synchronizing signal within the blanking period of a video signal; and superimposing said coded data on said video signal in synchronism with said detected predetermined horizontal synchronizing signal within the blanking period of said video signal.

10. A character display method according to claim 7 further comprising the steps of:

decoding a character broadcast coded signal superimposed on the video signal;

generating a character display timing signal on the basis of said decoded data; and superimposing said character display timing signal on an output video signal.

11. A character display method according to claim 9, wherein the step of generating character coded data includes generating character coded closed caption data.

12. A character display method according to claim 9, wherein the step of generating character coded data includes generating character coded data without demodulating character information.

13. A character display method comprising the steps of:

generating character coded data conforming to a signal format of a character broadcast coded signal by using a character display circuit for generating a character display timing signal in synchronism with vertical and horizontal synchronizing signals;

detecting a predetermined horizontal synchronizing signal within the blanking period of a video signal; and superimposing said coded data on said video signal in synchronism with said detected predetermined horizontal synchronizing signal;

wherein said step of generating character coded data includes performing control such that the integer multiple of the period for dots constituting one character equals one bit of the character broadcast signal.

14. A character display method according to claim 8 wherein said step of generating character coded data includes performing control such that the period for one character equals one bit of the character broadcast coded signal.

* * * * *

UNITED STATES PATENT AND TRADEMARK OFFICE
CERTIFICATE OF CORRECTION

PATENT NO.   : 5,541,663
DATED        : July 30, 1996
INVENTOR(S)  : Ohno

It is certified that error appears in the above-indentified patent and that said Letters Patent is hereby corrected as shown below:

Column 7,

Claim 5, line 4, after "to" insert --a--.

Claim 10, line 1, delete "7" insert --9--.

Claim 14, line 1, delete "8" insert --13--.

Signed and Sealed this

Twenty-ninth Day of February, 2000

Attest:

Q. TODD DICKINSON

Attesting Officer

Commissioner of Patents and Trademarks